June 25, 1929.  T. ADDISON ET AL  1,718,726
OILING SYSTEM
Filed Aug. 5, 1925      2 Sheets-Sheet 2
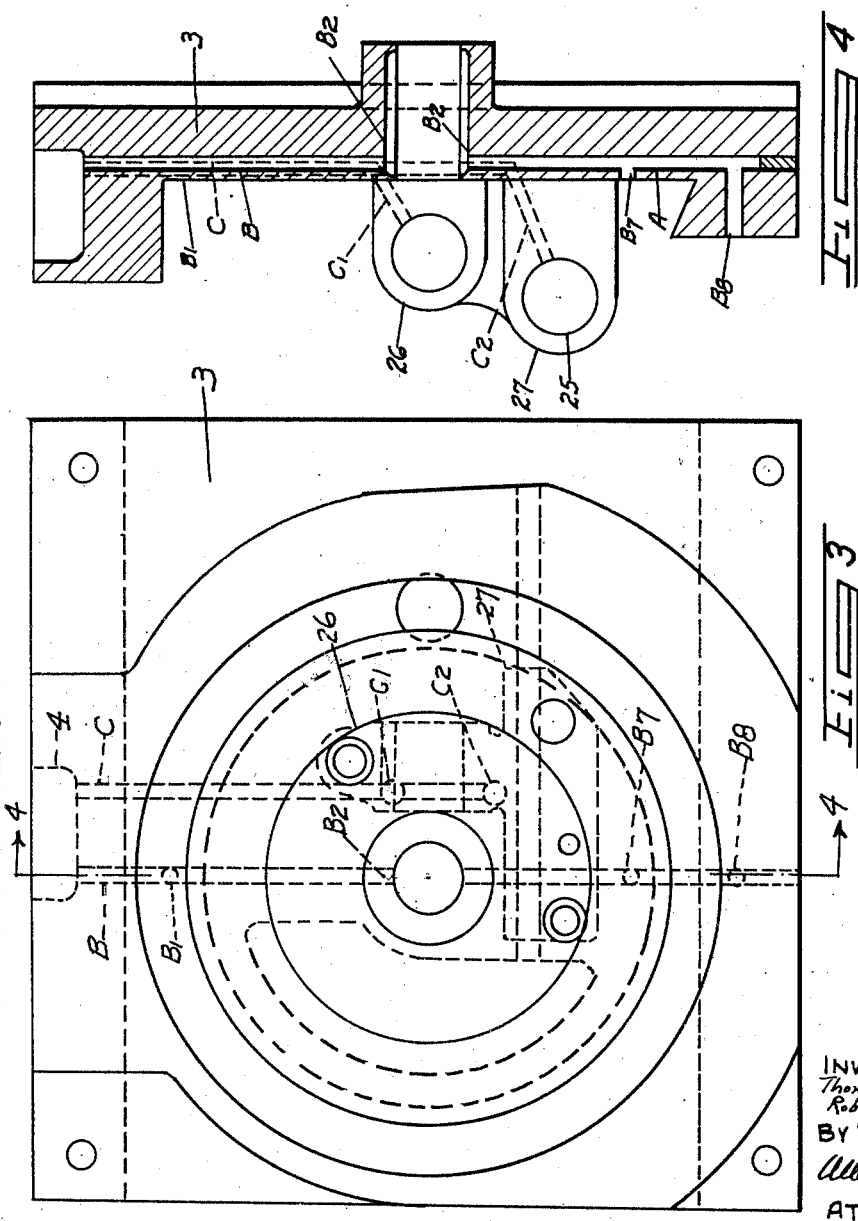

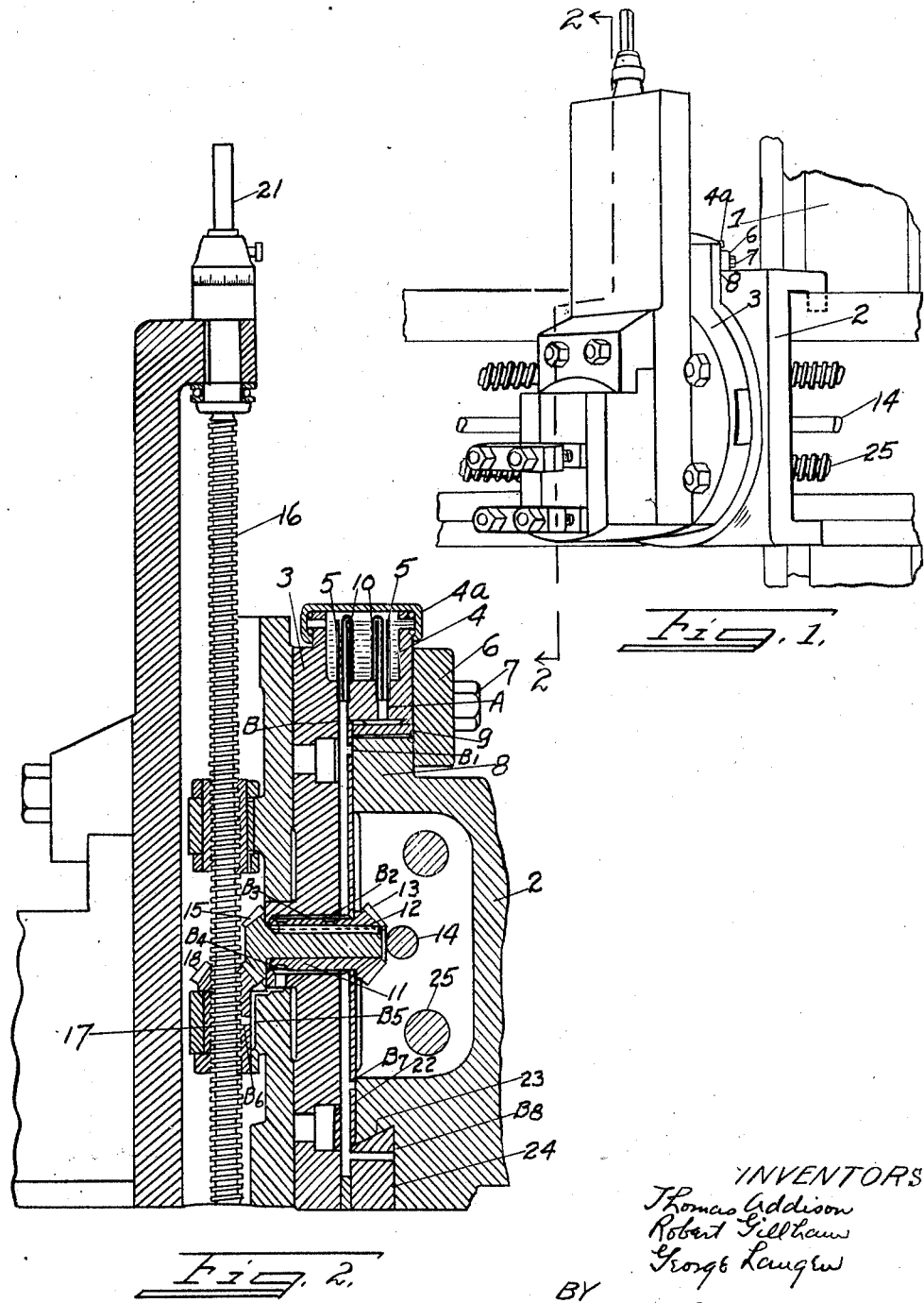

Patented June 25, 1929.

1,718,726

UNITED STATES PATENT OFFICE.

THOMAS ADDISON, ROBERT GILLHAM, AND GEORGE LANGEN, OF CINCINNATI, OHIO, ASSIGNORS TO THE CINCINNATI PLANER COMPANY, OF CINCINNATI, OHIO, A CORPORATION OF OHIO.

OILING SYSTEM.

Application filed August 5, 1925. Serial No. 48,402.

Our invention relates to oiling systems in general and particularly to an oiling system adapted to be incorporated in the saddle of a planer.

It is the object of our invention to provide for the saddle and the cross rail of a planer, an oiling system with a supply reservoir in the saddle, which will provide positive oiling for all the moving parts and bearing surfaces of the saddle and which shall be connected with oil ways adapted to lubricate all the bearing surfaces and actuating parts of the tool holder and the adjustment screws within the cross rail.

In oiling rails, screws and saddles in metal planers it has been the practice to supply oil to the bearing surfaces of the cross rail on the end, but the saddle in moving back and forth on the cross rail has tended to wipe the oil back toward the end of the rail, rather than to distribute the oil as intended and the lubricating of the bearing surfaces of the saddle has consequently been faulty. With such types of construction the oil of the saddle mechanism has been accomplished by oil cups and the like disposed in different positions on the saddle.

It is the object of our invention to incorporate in a central, enclosed system within the saddle, an oiling system which shall lubricate all the working parts and bearing surfaces of the saddle, rail tool holding plate and tool holder with further provision for disposing oil ways so as to lubricate adjustment screws which carry the lubricant to inaccessible parts of the mechanism.

Referring to the drawings in which we have illustrated our preferred structure:

Figure 1 is a perspective view of a portion of a planer showing a saddle, a portion of the cross rail, and portions of the actuating parts of the cross rail and a portion of the housing.

Figure 2 is a section of the saddle and a part of the cross rail as indicated by the dotted lines 2, 2, in Figure 1.

Figure 3 is a front elevation of the saddle head with the tool post supporting head removed.

Figure 4 is a section of the view shown in Figure 3 as indicated along the lines 4—4.

Generally indicated at 1 is the housing of the planer. The cross rail is shown at 2. The saddle head indicated generally at 3 is provided with an oil reservoir 4 covered with a cap 4ª with pipes 5 extending up through the base of the well. The saddle head is slidably mounted on the cross rail and a rail clamp 6 which may conveniently be adjustably secured with bolts 7, enclosing on three sides the top portion 8 of the cross rail. A gib 9 may conveniently be adjusted between the top of the cross rail and the portion of the saddle head which extends so as to support the clamp 6. Bearing surfaces are provided for the faces of the saddle and the portions of the rail where the saddle head has bearing. The oiling system is provided with apertures which extend from the base of the pipes 5 and pieces of wicking 10, extending from the oil within the reservoir into the pipes supply a regulated amount of lubricant to the apertures.

In order to trace the oil ways and the different parts lubricated thereby we have lettered the apertures A, B and C. The aperture A in Figure 2 is shown extending down through the saddle head and supplying oil to the gib 9. From the gib oil spreads along it and lubricates the clamp 6 and the bearing surface between the saddle head and the cross rail. The gib has oil holes in it as shown.

The oil way indicated at B in Figures 2, 3 and 4, extends straight down through the head with cross oil ways extending into it at various positions. The first cross oil way is shown at $B^1$ and it extends horizontally through the head to an outlet between the head and the cross rail. Extending down through the head from this branch oil way, the aperture extends into a groove $B^2$ which extends about a bearing 11 on the worm drive shaft 12 at the ends of which are mounted the beveled gear 13 engaging a driving gear on the rail shaft 14 and the beveled gear 15 which operates the vertical screw 16 for elevating the tool holder. Apertures through the bearing 11 supply lubricant for the gear engaged parts. A horizontal oil aperture $B^3$ extends from the main aperture at the juncture of the aperture and the groove extending around the bearing to a peripheral groove $B^4$ extending about the bearing 11, which supplies an aperture $B^5$ which is disposed about the hub 17 of the driver 18 for the elevating screw 16 of the tool holder. The oil from this oil aperture or pocket extends through an aperture $B^6$ and lubricates the screw and the interior of the part 18, and spreads over the threads of the screw during the travel of the head.

Extending down from the groove B² the oil aperture is provided with the branch oil ways B⁷ and B⁸ which extend through the head into the bearing surfaces between the cross rail and the saddle head at the bottom end of the cross rail. In the illustration the saddle has an upper face 22 parallel with the inner face of the saddle head and an inwardly projecting angular face 23 and a lower face 24 parallel with the inner face of the saddle head.

The oil aperture C is particularly adapted to lubricate the driving screw 25, for imparting horizontal movement to the saddle, and the elevating drive shaft 14. The oil aperture is therefore extended vertically down through the head and branch oil apertures are disposed, the aperture C¹ to extend into the bracket 26 which carries the splined gear (not shown) that is to be driven by the shaft 14, and the aperture C² through the bracket 27 which carries the fixed nut through which horizontal motion is imparted to the saddle, from the screw 25.

The driving screw 25 carries the oil spread over its threads to the teeth of the fixed nut which transmits horizontal movement to the saddle. Thus it may be observed that according to our invention we employ the saddles for automatically lubricating all parts of the mechanism with which they are directly related, taking advantage of the travel of the saddles to spread the lubricant even to the extent of the rail screws and engaging parts by supplying oil on these screws to be carried to the worm gears and nuts which these screws actuate.

Having thus described our invention, what we claim as new and desire to secure by Letters Patent, is:—

In a planer in combination with a cross rail, a saddle mounted on the cross rail and the operating screws, shafts and gears for moving the saddle and a tool holder carried by the saddle, an oil reservoir on the saddle, apertures extended from the reservoir to bearing surfaces of the saddle and wicking extended within the reservoir and supplying oil to the apertures and apertures extending vertically down through the saddle with branch apertures leading from the vertical apertures for lubricating the bearing surfaces of the saddle and the cross rail and an aperture extending vertically down through the saddle with transverse inclined apertures extending therefrom for lubricating the driving mechanism for moving the saddle horizontally on the cross rail and a tool holder vertically on the saddle.

THOMAS ADDISON.
ROBERT GILLHAM.
GEORGE LANGEN.